(12) United States Patent
Poppelaars et al.

(10) Patent No.: US 6,262,193 B1
(45) Date of Patent: Jul. 17, 2001

(54) PROCESS FOR THE PREPARATION OF POLYMER PARTICLES

(75) Inventors: Adrianus Cornelis Poppelaars, Breda; Johannes Maria Zijderveld, Zevenbergen, both of (NL)

(73) Assignee: Nova Chemicals (International) S.A. (CH)

( * ) Notice: Subject to any disclaimer, the term of this patent is extended or adjusted under 35 U.S.C. 154(b) by 0 days.

(21) Appl. No.: 09/579,780

(22) Filed: May 26, 2000

(30) Foreign Application Priority Data

Jun. 3, 1999 (EP) .................................................. 99304348

(51) Int. Cl.$^7$ .................................. C08F 2/18; C08J 9/20
(52) U.S. Cl. .............................. 526/73; 526/86; 526/228; 526/232.1; 526/346; 521/56; 521/60; 521/146
(58) Field of Search ................................ 526/73, 86, 228, 526/232.1, 346; 521/56, 60, 146

(56) References Cited

U.S. PATENT DOCUMENTS 3,657,162 * 4/1972 Finestone et al. ...................... 521/56
4,525,484    6/1985 Hahn et al. .

FOREIGN PATENT DOCUMENTS

| 0 350 137 B1 | 1/1990 | (EP) . |
| 0 391 499 B1 | 10/1990 | (EP) . |
| 0 403 023 B1 | 12/1990 | (EP) . |
| 0 405 324 B1 | 9/1994 | (EP) . |
| 98/01488 | 1/1998 | (WO) . |
| 98/01489 | 1/1998 | (WO) . |
| 98/01501 | 1/1998 | (WO) . |

* cited by examiner

*Primary Examiner*—Fred Teskin
(74) *Attorney, Agent, or Firm*—Kenneth H. Johnson

(57) ABSTRACT

Process for the preparation of polyvinylarene polymer particles by suspension polymerization, wherein
  (a) vinylarene monomers are suspended in an aqueous medium to yield a suspension;
  (b) the temperature of the suspension is adjusted to a temperature above 50° C., at which temperature an initiator is added;
  (c) subsequently, the reaction temperature is increased by 5 to 30° C. per hour until a temperature of at least 120° C. has been reached; and
  (d) the temperature is retained at a temperature of at least 120° C. until the polymerization is complete.

10 Claims, No Drawings

PROCESS FOR THE PREPARATION OF POLYMER PARTICLES

FIELD OF THE INVENTION

The present invention relates to a process for the preparation of polyvinylarene polymer particles. More specifically, the present invention relates to a process for the preparation of polyvinylarene polymer particles, wherein the polymerization reaction is started at a relatively high temperature. This process allows for short batch cycle times, a reduced need of energy and allows for particles having advantageous median particle sizes and particle size distributions. Vinylarene throughout this patent document means an aromatic compound to which at least one vinyl group is attached.

BACKGROUND OF THE INVENTION

Polyvinylarene polymer particles are well known in the art. An example of such particles is polystyrene. Polystyrene is prepared on a commercial scale by suspension polymerization.

EP-B-405 324 discloses such a suspension polymerization process. According to this document, styrene monomers are suspended at room temperature in an aqueous phase together with a suitable initiator and customary stabilizers and additives. Initiation of the polymerization is caused by heating the polymerization batch from room temperature to 80 to 90° C. within 2 hours. Subsequently, the temperature is gradually increased to a temperature in the range of 120 to 130° C.

The process disclosed in EP-B-405 324 has the disadvantage that it requires a high energy input. Namely, each new polymerization batch requires mixing of the components at room temperature and subsequent heating to 80 to 90° C.

In addition, Applicant has found that the process of EP-B-405 324 results in particles with a relatively small median particle size, which makes these particles less suitable for certain applications such as insulation applications, drainage applications and sit bags.

Furthermore, Applicant has found that the process of EP-B-405 324 leads to particles having a relatively broad particle size distribution. This is undesirable, since polyvinylarene polymer particles in a particular desired size range should be formed in an adequate amount. The occurrence of oversized or undersized grains should be as small as possible, i.e. the particle size distribution should be narrow.

SUMMARY OF THE INVENTION

It was an object of the present invention to provide a suspension polymerization process for the preparation of polyvinylarene polymer particles which does not yield the above mentioned disadvantages.

Surprisingly, it was found that this object can be achieved in a suspension polymerization process wherein the initiator is added to the polymerization mixture at a temperature above 50° C.

Accordingly, the present invention relates to a process for the preparation of polyvinylarene polymer particles by suspension polymerization, wherein:

(a) vinylarene monomers are suspended in an aqueous medium to yield a suspension;

(b) the temperature of the suspension is adjusted to a temperature above 50° C., at which temperature an initiator is added;

(c) subsequently, the reaction temperature is increased by 5 to 30° C. per hour until a temperature of at least 120° C. has been reached; and (d) the temperature is retained at a temperature of at least 120° C. until the polymerization is complete.

In the process of the present invention there is no need to admix the vinylarene monomer and initiator at room temperature and heat the resulting mixture all the way to 80 to 90° C. The vinylarene monomers can be suspended in an aqueous medium which already has a relatively high temperature. Apart from shorter batch cycle times, this also results in a gain in energy. Furthermore, polymer particles resulting from this process have advantageous particle sizes for particular applications and have a narrow particle size distribution.

Suitable vinylarene monomers to be used in the present process are well known in the art and can suitably be selected from styrene, α-methylstyrene, p-methylstyrene, chlorostyrene, dimethylstyrene, vinyltoluene and similar styrenic derivatives. Preferably, the vinylarene is styrene.

The polyvinylarene polymer resulting from the process according to the invention preferably is a polymer containing at least 50% by weight of styrene. Optionally, the polymer contains further co-monomers such as other vinylarene monomers, butadiene, acrylonitril, acrylic acid, methacrylic acid and esters of (meth)acrylic acid with alcohol compounds having 1–10 carbon atoms such as methyl methacrylate. Preferably, the polyvinylarene is polystyrene.

The vinylarene monomers are suspended in an aqueous medium to yield a suspension. The volume ratio between the organic phase and aqueous medium may vary between wide ranges, as will be appreciated by a person skilled in the art. Suitable volume ratios include 1:3 to 4:3. The optimal ratio is determined by economic considerations. Preferably, a ratio of 1:1 is used.

The suspension suitably contains one or more conventional stabilizing agents, such as poly(vinyl alcohol), gelatine, agar, sodium salt of polyacrylic acid and polymethacrylic acid, polyethylene glycol, hydroxyethyl or hydroxymethyl cellulose, carboxy methyl cellulose, methyl cellulose, polyvinyl pyrrolidine, polyacrylamide, copolymer of styrene and maleic acid, preferably in a molar ratio of between 2:1 and 1:2, ethylene glycol or combinations thereof, sodium dodecyl-sulphonate, alkali metal salts of fatty acids, water soluble persulphates (sodium persulphate, potassium persulphate) or sodium bisulphites. Further, it is possible to use inorganic stabilizers such as alumina, bentonite, magnesium silicate or phosphates, like tricalciumphosphate and/or disodiumhydrogen phosphate, optionally in combination with any of the stabilizing compounds mentioned earlier. The amount of stabilizer may suitably vary from 0.1 to 0.9% weight, based on the weight of the aqueous medium.

After the vinylarene monomers have been suspended in the aqueous phase, the temperature of the suspension is adjusted to a temperature above 50° C. Preferably, the temperature is adjusted to from 70 to 95° C., more preferably to from 80 to 90° C.

When a temperature of above 50° C. has been reached, an initiator is added. Typically, the initiator to be added is a radical initiator having a half-life of one hour in benzene at 70 to 110° C., preferably at 80 to 100° C. In particular, the radical initiator is a peroxide compound having these half-life values. Suitable radical initiators for use are tert-amylperoxy-pivalate, di(2,4-dichlorobenzoyl)peroxide, tert-butylperoxy-pivalate, di(3,5,5-trimethyl-hexanoyl)peroxide, didecanoyl-peroxide, di-lauroylperoxide, di(2- methylbenzoyl)peroxide, 2,5-dimethyl-2,5-di(2-ethylhexanoyl)hexane, di(4-methylbenzoyl)peroxide, dibenzoyl-peroxide, tert-amylperoxy-2-ethylhexanoate, tert-butylperoxy-2-ethylhexanoate, tert-butylperoxy-isobutyrate, tert-butyl-monoperoxy-maleate. Preferably, dibenzoyl-peroxide used. The skilled person will understand that at different temperature levels different initiators may be used in accordance with the half-lives of the initiator.

If desired, a radical initiator having a half-life of one hour in benzene at higher temperatures, e.g. 110–135° C. may be used in addition to the initiators mentioned in the previous paragraph. Examples of such initiators are 1,1-di(tert-butylperoxy)-3,3,5-trimethylcyclohexane, 1,1-di(tert-butylperoxy)cyclohexane, tert-butyl perbenzoate, 2,2-di(tert-butylperoxy)butane, tert-butylperoxy-isopropylcarbonate, tert-butylperoxy-acetate, tert-amylperoxy-benzoate, tert-butylperoxy-benzoate, n-butyl-4,4-di(tert-butylperoxy)valerate, tert-butylperoxy-(2-ethylhexyl)carbonate, dicumylperoxide. Preferably, tert-butyl perbenzoate, tert-butylperoxy-isopropylcarbonate, tert-butylperoxy-(2-ethylhexyl)carbonate and/or dicumylperoxide are used.

The amount of initiator to be added typically varies in the range of 0.05 to 1.0% by weight, based on the amount of vinylarene monomer.

When the initiator has been added to the suspension, the reaction temperature is increased by 5 to 30° C. per hour until a temperature of at least 120° C. has been reached. Preferably, the temperature increase is from 6 to 25° C. per hour, more preferably from 8 to 15° C. per hour. Typically, the temperature increase is conducted continuously. Suitably, a temperature of from 120 to 140° C. must be reached, more suitably from 120 to 130° C.

After having reached a temperature of at least 120° C., the polymerization is continued until it is complete. By "complete" it is meant that the residual monomer content in the polymer has dropped below 2% by weight, preferably below 0.35% by weight, more preferably below 0.1% by weight, based on the weight of polyvinylarene. Suitably, this is achieved by maintaining the temperature of the polymerization mixture between 120 and 130° C. for a sufficient period of time.

The polymerization reaction is an exothermic reaction. This allows for an efficient energy use, since the reaction heat generated by the polymerization reaction can be used to further heat the polymerization mixture. This way, almost no external energy is needed.

Before, during or after the process, a foaming agent may be added in order to render the polyvinylarene polymer particles expandable. Preferably, the foaming agent is added during the polymerization reaction, more preferably between 60 and 70% monomer conversion. Typical foaming agents are organic gaseous compounds like $C_{3-6}$ aliphatic hydrocarbons such as propane, butane, pentane, hexane, cyclohexane or halogenated hydrocarbons or more environmentally friendly foaming agents such as water, ethanol, $CO_2$. Preference is given to commercially available pentane, which predominantly consists of n-pentane and isopentane. The amount of foaming agent can be selected by the person skilled in the art from known ranges. Such ranges include 2 to 20 weight %, preferably 3 to 8% by weight, based on the amount of vinylarene monomers.

It may be advantageous to polymerise the vinylarene monomers in the presence of other polymers such as polyphenylene oxide, elastomeric polymers, polar polymers or emulsifiers. These other polymers may be added before or during the suspension polymerization. Suitable polyphenylene oxides have been described in EP-A-350137, EP-A-403023 and EP-A-391499 (incorporated herein by reference). The polyphenylene oxide is preferably present in an amount of between 1 and 40 weight %, based on the amount of vinylarene monomers, and may improve the thermal stability of the resulting polymer particles. Examples of suitable elastomeric polymers have also been described in EP-A-350137 and comprise (block) copolymers of vinyl substituted aromatic monomer and a conjugated diene monomer. These elastomeric polymers are preferably present in an amount of 0.5 to 10 weight %, based on the amount of vinylarene monomers. Examples of polar polymers have been described in e.g. WO 98/01501 and comprise e.g. starch, and starch modified by esterification or etherification. Examples of suitable emulsifiers are described e.g. WO 98/01488 and WO/01489 and comprise e.g. bisalkylsulphosuccinates, sorbitol-$C_{8-20}$-carboxylates, and $C_{8-20}$-alkylxylene sulphonates.

Vinylarene strains can be crosslinked by using crosslinking agents having one or more unsaturated carbon-carbon bonds. Examples of suitable crosslinking agents are butadiene, isoprene, divinyladipate and divinylbenzene. The first and latter compounds are the most suitable because of their complete compatibility with the vinylarene monomers. When using crosslinking agents, the polymerization is preferably carried out in the presence of a relatively small amount of crosslinking agent, e.g. from 0.001 to 0.1% weight, based on the amount of vinylarene monomers.

If desired the polymerization process may be carried out in the presence of a chain transfer agent. The person skilled in the art will appreciate that these chain transfer agents can be selected from mercaptans, such as $C_{2-15}$-alkyl mercaptants, e.g. n-dodecylmercaptan, n-butyl mercaptan or t-butyl mercaptan. Preferred are aromatic compounds such as pentaphenyl ethane and the dimer of α-methyl styrene.

It will be appreciated that the polymer particles of the present invention may contain additional additives in effective amounts which can be added before, during or after the polymerization. Such additives include regulators for foam porosity, nucleating agents like waxes such as polyethylene wax or paraffin wax, dyes, carbon black, graphite, fillers, lubricants, stabilizers, which are well-known in the art. Of particular interest are flame-retarding compounds like described in U.S. Pat. No. 4,525,484 and comprise compounds which are based on organic bromine or chlorine compounds such as trisdibromopropyl phosphate, hexabromocyclododecane, chloroparaffin, as well as substances which act synergistically with flame retardants such as dicumylperoxides and other organic peroxides which decompose at high temperatures. Also important are coating compositions containing glycerol or metal carboxylates. Such compounds may reduce the tendency of the particles to agglomerate. In the case of expandable particles, such compounds may also result in improved expansion rates, in faster cooling times after moulding and in improved strength or non-shrinkage behavior of the molded article. Suitable carboxylates are glycerol mono-, di- and/or tristearate and zinc or magnesium stearate. Instead of stearate, one may also use citrate or palmitate compounds. Also other coating compounds may be used such as silicones or silicates. The coating compositions are deposited on the particles via known methods, e.g. via dry-coating in a ribbon blender or via slurry solution in a readily vaporizing liquid.

The polymer particles according to the present invention advantageously have an average diameter of 0.1 to 6 mm, preferably 0.4 to 3 mm.

Further processing of the polyvinylarene polymeric particles may be carried out in the usual ways, such as preexpansion of particles containing blowing agent, extrusion and molding techniques.

The invention is now demonstrated by the following examples.

EXAMPLE 1

In a pilot plant reactor, 76.2 kilogram demineralized water was mixed with 266 gram tricalcium phosphate (TCP) and 20 gram disodiumhydrogen orthophosphate (DSHOP) at a temperature of 80° C. Hereafter, 76.1 kilogram styrene and 550 gram hexabromocyclododecane (HBCD) were added under stirring at 170 rpm.

Subsequently, the temperature of the reaction mixture was adjusted to 86° C. and 94 gram dibenzoylperoxide (DBPO), and 196 gram tert-butylperoxy-(2-ethylhexyl) carbonate (tBPEHC) were added, as well as other conventional additives.

Hereafter, the temperature of the reaction mixture was increased continuously from 86° C. to 122.5° C. in 240 minutes. Hence, the temperature increase was 9.1° C. per hour. 191 minutes after dosing the initiator, 9.6 litre pentane was added. When the 122.5° C. was reached, the temperature was maintained at this level for 45 minutes and was subsequently raised to 127.5° C. where it was maintained for 75 minutes, so that the residual monomer content has dropped below 0.1% by weight. The reaction mixture was cooled and the resulting polymer particles were filtered, washed and dried.

The median particle size was determined by sieve analysis and is understood to be the value at which 50% of the weight of the particles of the batch have a smaller particle size and 50% by weight of the particles batch have a bigger particle size. The median particle size of the particles was 1.11 mm.

The particle size distribution was also determined by sieve analysis and is calculated by the expression $(P_{90}-P_{10})/P$, wherein:

$P_{90}$ is the value at which 90% by weight of the particles of the batch have a smaller particle size;

$P_{10}$ is the value at which 10% of the particles of the batch have a smaller particle size; and P is the average particle size.

The particle size distribution was 0.39.

COMPARATIVE EXPERIMENT

Example 1 was repeated with the exception that water, TCP, DSHOP, styrene, HBCD, DBPO, tBPEHC and the other additives were mixed at 25° C. The resulting mixture was heated in one hour to 86° C. Hereafter, the procedure of Example 1 was followed. The determination of the median particle size and particle size distribution was carried out identically to the method described for Example 1. The median particle size of the particles was 0.66 mm. The particle size distribution was 0.59.

The advantages of the process according to the invention are evident. First of all, it is not necessary to use substantial energy to heat the suspension from room temperature to 86° C. This allows for shorter cycle times and energy savings. Furthermore, the process allows for a more adequate targeting of the bead size (narrow bead size distribution) and, for a given recipe, for larger median particle sizes. The latter are desirable for applications where relatively large particle sizes are needed, such as insulation, drainage and sit bags.

What is claimed is:

1. Process for the preparation of polyvinylarene polymer particles by suspension polymerization, wherein (a) vinylarene monomers are suspended in an aqueous medium to yield a suspension;

(b) the temperature of the suspension is adjusted to a temperature above 50° C., at which temperature an initiator is added;

(c) subsequently, the reaction temperature is increased by 5 to 30° C. per hour until a temperature of at least 120° C. has been reached; and (d) the temperature is retained at a temperature of at least 120° C. until the polymerization is complete.

2. Process according to claim 1, wherein the temperature in (b) is adjusted to from 70 to 95° C.

3. Process according to claim 2, wherein the initiator is a radical initiator having a half-life of one hour in benzene at 70–110° C.

4. Process as claimed in claim 3, wherein the initiator is dibenzoyl peroxide.

5. Process as claimed in claim 4, wherein in addition a radical initiator having a half-life of one hour in benzene at 110–135° C. is used.

6. Process according to claim 5, wherein the reaction temperature in (c) is increased by from 6 to 25° C. per hour.

7. Process according to claim 6, wherein the reaction temperature in (c) is increased by from 8 to 15° C. per hour.

8. Process according to claim 7, wherein the reaction temperature in (c) is increased continuously.

9. Process according to claim 8, wherein in (d) the polymerization is complete when the residual monomer content in the polymer has dropped below 0.35% by weight, based on the amount of polyvinylarene.

10. Process according to claim 9, wherein a foaming agent is added before, during or after the polymerization process.

* * * * *